Jan. 25, 1966  D. S. JOHNSTON  3,230,579
FISH STEAK PRODUCING MACHINE
Filed Oct. 8, 1962  2 Sheets-Sheet 2
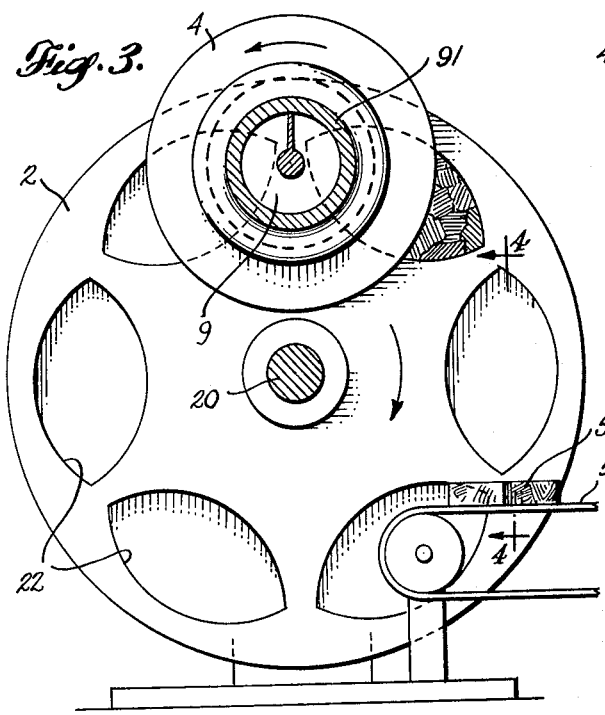
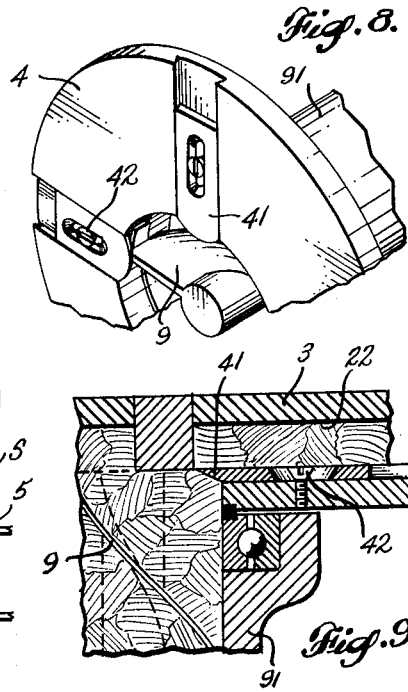
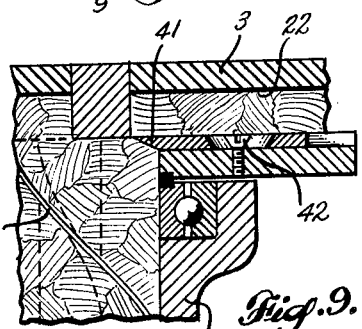
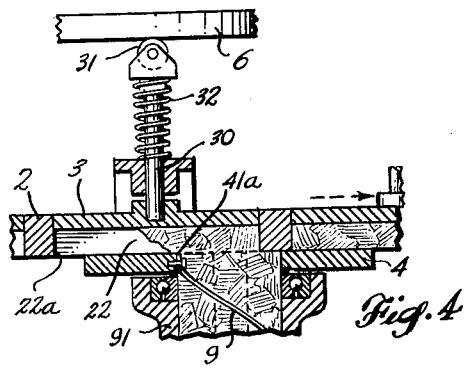
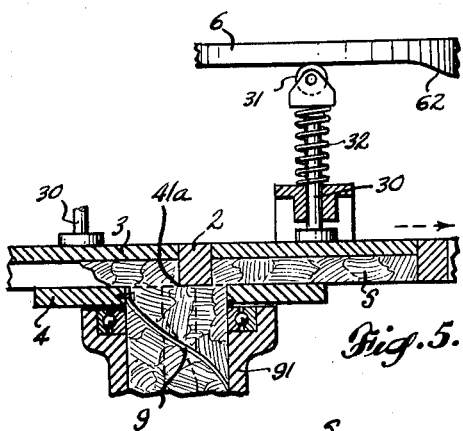
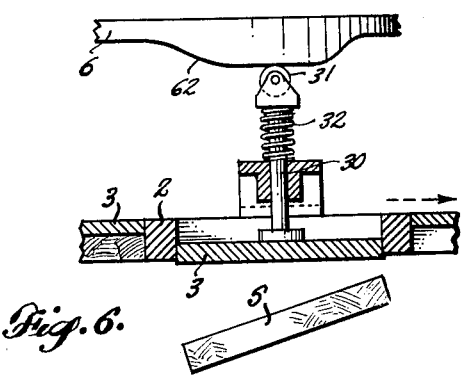
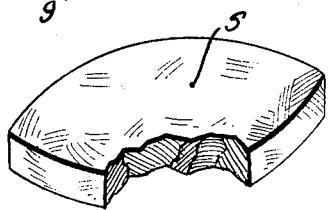
INVENTOR.
DONALD S. JOHNSTON
BY
Reynolds + Christensen
ATTORNEYS

United States Patent Office 3,230,579
Patented Jan. 25, 1966

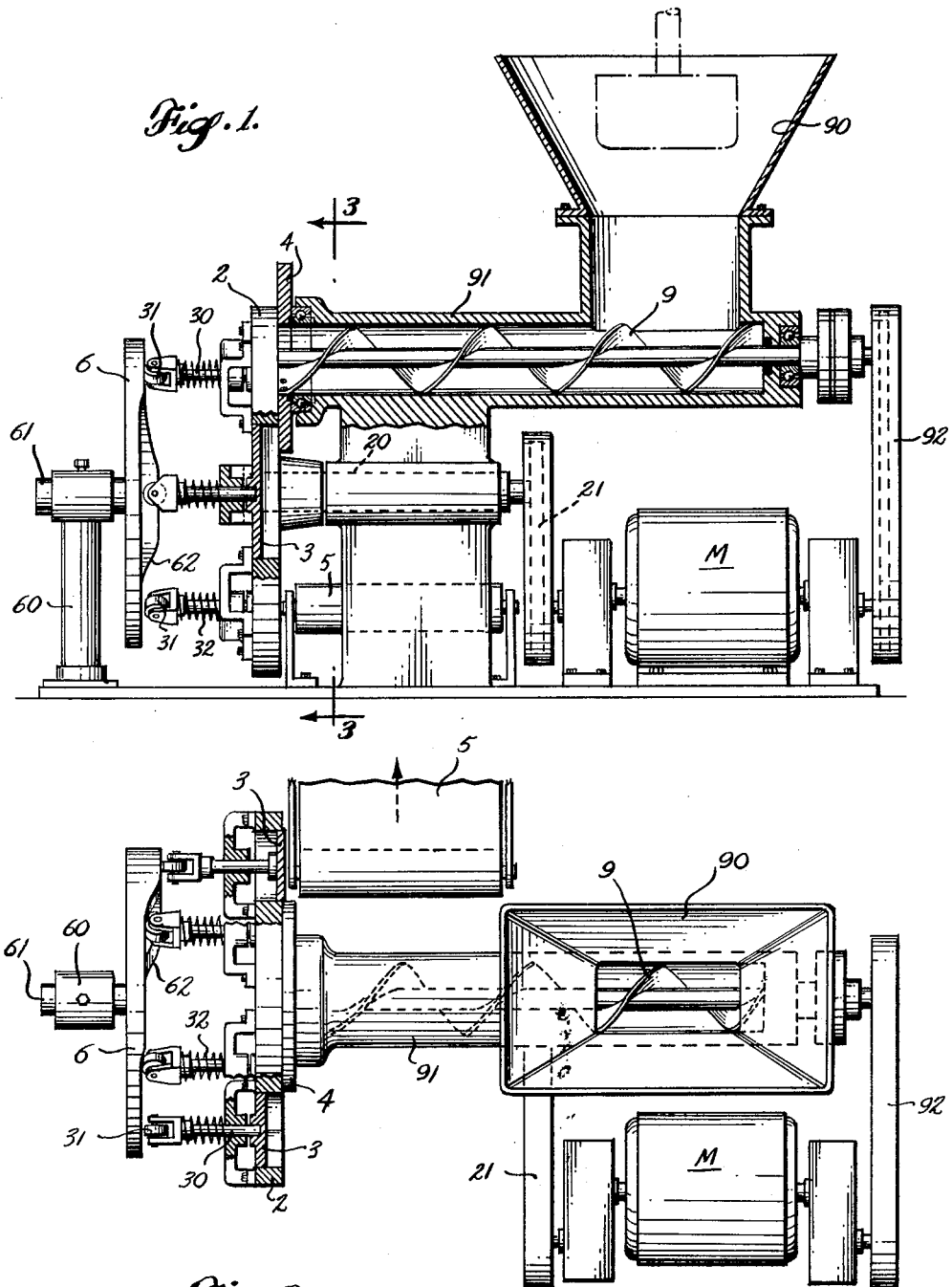

3,230,579
FISH STEAK PRODUCING MACHINE
Donald S. Johnston, 10141 SE. 8th St., Bellevue, Wash.
Filed Oct. 8, 1962, Ser. No. 229,020
1 Claim. (Cl. 17—32)

The present invention concerns, broadly speaking, the manufacture of novel fish products in the form of fish steaks composed of chunks or strips (i.e. whole pieces each of appreciable size) of fresh fish adhering one to another, and arranged in a standard outline, and each of a standard thickness, size, and weight, ready for cooking by frying or otherwise, to constitute individual portions.

Fish cakes have been made of ground or shredded fish, but such comminuted product loses much of the moisture, the flavor, and the nutrients which accompany the moisture, and so the fish cakes made of such material are of somewhat inferior quality. Moreover, they have no appreciable tendency toward cohesion, and tend to revert to shreds during handling and cooking. By this invention steaks are made of chunks or strips of fish such, for instance, as may be made up from fillets and portions of fillets, the chunks being pressed together and overlapped so that they tend to adhere one to another, and while thus compressed in a column are cut or sliced off cleanly, one by one, from the column in measured quantities. In the process of their severance from the column they are lapped one over another, and pressed together, this procedure being termed herein "polishing," and when discharged they tend to remain in the form of a standard steak composed of a number of such cohesive chunks. Such steaks are suitable for freezing and storage or for direct marketing and use. They simplify packaging and merchandising by weight and size, are highly nutritive and possess most of the flavor and much of the smooth textural qualities of the original fillets.

Because of the nature of the product, it is necessary to sever each steak cleanly from the column in a manner that will maintain a given plane of severance, to the end that the steak, when severed from the column, is maintained in its predetermined shape and size, with all chunks tending to cohere one with the others in an individual steak of a standard size and weight, such as a steak suitable for an individual serving.

In producing fish cakes with the machine of this invention, whole pieces of fish are pressed into a mold cavity so as to fill the cavity to a predetermined depth under pressure sufficient to cause substantially uniform density of material throughout the cavity and cohesion between the pieces, but which pressure is insufficient to destroy the tissue structure within the pieces or to extrude natural juices from the flesh, and thereby impair its nutritional value and destroy its flavor characteristics. In the preferred and illustrated practice of the method, these pieces are fed en masse as a column, are advanced into the mold cavity under pressure, and finally are sheared off at the mold face while under such pressure, and while being subjected to a lateral "polishing" action which tends to lap one chunk over another and to insure their cohesion. Subsequent ejection of the molded product prepares the mold for subsequent reuse, whereby under rapid production conditions, the process may be conducted on a continuous basis.

In accordance with this invention the molding machine has a succession of mold cavities moved progressively across the discharge end of the feed tube or duct through which the column of fish pieces being fed under pressure against the cavity are guided. As a mold cavity moves progressively into and from registry with the duct, the chunks flow somewhat plastically as the cavity is filled, and its contents are bonded together under pressure sufficiently to remain intact as a molded steak after severance and upon ejection from the cavity. A dry member, characterizing the invention, is interposed between the mold cavity and the duct. This dry member or shear plate, as it is herein termed, rotates continuously about an axis defining the direction of feed, and serves both to sever the column of fish at the entrance to the mold cavity, and to polish or smooth the steak at the cavity face as the cavity is being filled and advanced beyond the discharge end of the duct. Such polishing or smoothing action, effected by the shear plate, works or spreads the surface materials of the different pieces or chunks across the surfaces of the neighboring pieces, and thereby further integrates the mass into a cohesive whole.

The accompanying drawings show the invention in a representative form, the drawings of the machine showing a preferred form, and the drawing of the steak showing a typical form.

FIGURE 1 is in part a side elevational view and in part a sectional view axially of the feed worm, illustrating the machine.

FIGURE 2 is a plan view of the machine, with parts broken away.

FIGURE 3 is a transverse sectional view, on an enlarged scale, taken substantially at the line 3—3 of FIGURE 1.

FIGURES 4, 5 and 6 are detail sectional views illustrating successive steps in the formation, severance and delivery of a fish steak by the machine of this invention, the views being in the nature of sections at the line 4—4 of FIGURE 3, but with the rotative mold plate either approximately in registry with the shear plate and the feed tube, or in FIGURE 6 wholly beyond the same.

FIGURE 7 is an isometric view, partly broken away, to show the internal composition of an individual steak.

FIGURE 8 is an isometric view of a detail of a shear plate with separable knives, which constitutes a modified form of this portion of the machine, and FIGURE 9 is a view similar to FIGURE 4, but on a larger scale, showing such knives in the process of severing a steak from the column.

In general, the machine includes a tube and means to force chunks of fish through the same, such as a worm rotative therein, to advance heterogeneous chunks of fish (the term "chunk" being used herein to include pieces, strips, etc. of material size) in a substantially homogeneous column from a feed hopper toward a delivery point at the opposite end of the tube, at which delivery point the column of material flows en masse, plastically into a mold cavity repeatedly registering with the tube's delivery end, such as successive mold cavities in a mold plate that revolves past the delivery end of the tube. Differing from prior machines, and according to the present invention, the material in a mold cavity is severed from the column not by the revolution or other movement of the mold plate with relation to the end of the fixed feed tube, but by a shearing or severing plate, which may or may not be fitted with knives, that is rotatable about the delivery point of the tube and with relation to the column of material exiting from the tube. This effects clean severance of the chunky material, and tends to "polish" or smooth the molded steak, minimizes tearing or displacement forces within the molded product tending to disturb adherence of the pieces to one another, and in fact urges the pieces into better overlapping and cohesive relation. After revolution of the mold plate from registry with the feed tube, ejector means are operated to eject the severed steak from the mold cavity and to convey it away to be wrapped, or to be frozen, or to be cooked immediately. Primarily, it is the employment of the shear plate at the fixed location and rotative about the axis of the delivery end of the feed tube which distinguishes the present invention in its mechanical aspects.

In the preferred embodiment, shown in the drawings, the material, in the form of chunks or strips each of appreciable size, is fed into hopper 90 and thence into one end of a feed tube 91, and is advanced along the tube by means such as the feed worm 9 rotated from a motor M by suitable drive means indicated at 92. While there may be some severance of the chunks by the feed worm 9, for the most part the worm tends to lay them one upon another, and they tend to remain in chunky or strip form as the column of chunks is advanced lengthwise of the tube 91 toward its delivery end at the left in FIGURES 1 and 2. Adjacent the delivery end of the tube 91, a mold plate 2 is revoluble about an axis defined by the shaft 20, also driven from the motor M by suitable means indicated generally at 21. The axis of revolution is offset from the axis of the tube 91 and worm 9, and the mold plate is formed with mold cavities 22 (see FIGURE 3) in such position that as the disk revolves the cavities will successively come into registry with the discharge end of the tube 91 and will receive the material at the end of the column compressed within the tube 91. Since the column is formed of chunks or pieces, the material will tend to flow plastically into and to fill fully the successive mold cavities 22, but to remain as chunks, as it is seen doing in FIGURES 4 and 5. Each such cavity 22 is closed at the end distant from the tube 91 by an ejector 3, which will be described in greater detail hereinafter, which limits the depth of the mold cavity and, consequently, the amount of material that can be forced into the same.

Reliance is not placed upon the relative movement between the revolving mold plate 2 and the end of the fixedly positioned tube 91 for effecting severance of the molded steak from the column. Instead, intermediate the revolving disk or mold plate 2 and the delivery end of the tube 91 a shear plate 4 is rotatively mounted. Preferably, this is fixed to the end of the worm 9 and is rotated by the worm. The severing edges may be no more than the edge 22a of the mold cavity 22, cooperating with the edge 41a of the shear plate, or there may be knives 41 as shown in FIGURES 8 and 9, which are mounted in the shear plate 4, with sharpened edges projecting into the central aperture thereof and adjustable in and out by the bolt and slot means indicated at 42. While a plain shear plate corner such as 22a is preferred and will operate effectively, either such means, when rotated about the axis of the tube 91, will sever the extruded column of fish chunks cleanly, leaving each mold cavity completely filled with chunks defining an individual steak, and this will be carried from registry with the tube 91 by revolution of the mold plate 2, and at the appropriate place in its revolution the ejector 3 will be moved in the axial direction to eject the steak, which may then fall upon an off-bearing belt 5 to be carried to a place for further processing or for use. The rotation of the shear plate 4 past the severed or partially severed steak within each mold cavity polishes and flattens the steak, and tends to urge its component chunks together. The "spreading" or "buttering" effect of the rotating plate tends to work the surface layers of the fresh fish pieces together and further enhances the physical cohesiveness of the component pieces.

As a means for effecting ejecting movement of the ejectors 3, a stationary circular cam 6 is supported coaxially of the mold plate 2, but spaced in the axial direction from the latter. It may be supported upon a standard 60 which supports a stub shaft 61 of the cam 6, and the cam is provided with a rise 62 positioned to engage cam followers 31 upon the end of posts 30, which project from the ejectors 3, to urge the ejectors in the direction shown at the top of FIGURE 2 to effect ejection of a steak received within the mold cavity. Springs 32 return the ejectors 3, after they pass beyond the rise 62, to their position for admitting chunks of fish, and the cam will serve to prevent further retrograde movement of the ejectors. It will be seen that the ejectors 3 are individual each to a particular mold cavity, and that they revolve with the mold plate 2. The depth of the cavities can be varied by shifting the stub shaft 61 axially relative to its standard 60.

The separate knives of the type shown in FIGURES 8 and 9 permit the cutting of a steak closer to or farther from the center of the mold cavity. They also may be removed and sharpened when necessary. The shear plate face in which these knives are set by grooving of the plate is otherwise flat and the knives are held by countersunk screws having head faces flush with the face of the plate and of the knives.

As has already been indicated, the material in the form of chunks, such as are represented in FIGURES 4, 5 and 9, is delivered into the hopper 90 and is advanced by the worm feed 9 towards the left-hand end of the tube 91, and in the process the chunks are compacted and pressed together within the tube. At the delivery end of the tube, as a mold cavity 22 begins to register with the tube 91, the chunks of material flow plastically into the mold cavity 22, as is represented in FIGURE 4 at the left. All this time the shear plate 4 is rotating with the worm and tends to sever the material which has entered the mold cavity from the column which is pressing into the cavity, and is polishing already severed steaks or portions thereof. Eventually, the revolution of the mold plate 2 carries a given cavity out of registry with the tube 91, and by this time the rotating shear plate 4 has completed severance, polishing and working of the surface layer of materials together, leaving the cavity filled with a rather homogeneous flat steak of any given peripheral contour, corresponding to the contour of its cavity, and with at least one planar face, that which has just been smoothly severed. The opposite face, if desired, might be molded by suitable shaping of the contacting face of the ejector, but is usually flat and parallel to the severed face. After revolution of the mold plate has carried the steak to the discharge point, as at the line 4—4 in FIGURE 3, the ejector moves forward, ejects the steak S, and it falls upon the off-bearing belt 5 and is carried out of the way before the next steak is ejected.

As will be evident, equal angular spacing between the mold cavities 22 in the mold plate and the cavities of equal size are desirable where the feed screw is driven at a constant rate so as to advance the fish into the successive mold cavities uniformly and with substantially constant density.

The clean severance effected by the rotative shear plate 4 maintains the first within the individual steaks in the form of chunks, and these chunks tend to adhere one to another. In consequence, the steaks, all of the same weight and shape, may be individually wrapped, or may be frozen in the form in which they were severed from the mass, or may be immediately cooked and consumed. In FIGURE 7 it has been attempted to show a steak S as composed of individual chunks. These chunks, being pieces of fish of appreciable size, contain the greater part of the moisture and the flavor, for the pressure to which they have been subjected is insufficient to break down their tissues, or to squeeze from them the juices, and so they still contain the nutrient which is characteristic of the particular fish, and are not lacking in these characteristics as is a fish cake of shreadded fish. They require no binder to hold them together in handling or cooking, for all constituent chunks have been pressed sufficiently tightly together.

I claim:

A machine for forming fish steaks comprising a feed tube having an open discharge end, feed means mounted in said tube for advancing cohering fish chunks along said tube, in the form of a compact column, to its delivery end, revoluble mold plate means adjacent the discharge end of said tube, said mold plate means mounted to revolve on an axis offset from but parallel to the longitudinal axis of said tube and having a face thereof adjacent the discharge end of said tube perpendicular to its axis of rotation, said face having formed therein a series of mold cavities opening in said face and being equally spaced angularly about the axis of said mold plate means to register successively with said tube discharge end, and a rotatable shear plate mounted intermediate said mold plate means and said tube discharge end, said shear plate being provided with a sharpened edge cooperative with an edge of said mold cavity to sever from said column an individual steak-like portion located within said mold cavity.

References Cited by the Examiner

UNITED STATES PATENTS

| | | | |
|---|---|---|---|
| 2,324,202 | 7/1943 | Felton | 17—32 |
| 2,575,703 | 11/1951 | Carruthers | 99—171 |
| 2,635,050 | 4/1953 | Stevenson et al. | 99—188 |
| 2,669,378 | 2/1954 | Carruthers | 141—80 |
| 2,793,394 | 5/1957 | Menkens et al. | 17—32 |
| 2,840,121 | 6/1958 | Carruthers | 141—164 |
| 3,137,029 | 6/1964 | De Zolt | 17—32 |

SAMUEL KOREN, *Primary Examiner.*

HYMAN LORD, LUCIE H. LAUDENSLAGER,
*Examiners.*